US008527307B2

(12) United States Patent
Hamilton, II et al.

(10) Patent No.: US 8,527,307 B2
(45) Date of Patent: Sep. 3, 2013

(54) METHOD, SYSTEM AND PROGRAM PRODUCT FOR DISTRIBUTION OF FEEDBACK AMONG CUSTOMERS IN REAL-TIME

(75) Inventors: Rick A. Hamilton, II, Charlottesville, VA (US); William J. Huie, Poughkeepsie, NY (US); Jenny S. Li, Danbury, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/923,302

(22) Filed: Oct. 24, 2007

(65) Prior Publication Data

US 2009/0112683 A1  Apr. 30, 2009

(51) Int. Cl.
G06Q 40/00 (2012.01)

(52) U.S. Cl.
USPC ......................................... 705/7.11; 705/7.42

(58) Field of Classification Search
USPC .......................................... 705/10, 7.42, 7.11
See application file for complete search history.

(56) References Cited

U.S. PATENT DOCUMENTS

| 6,879,960 | B2 | 4/2005 | Nascenzi et al. |
| 7,044,369 | B2 | 5/2006 | Gantz |
| 2002/0005775 | A1 | 1/2002 | Sonnendorfer et al. |
| 2005/0017072 | A1 | 1/2005 | Tomita |
| 2005/0209915 | A1 | 9/2005 | Saluccio |
| 2005/0285741 | A1 | 12/2005 | Chipchase et al. |
| 2007/0024436 | A1 | 2/2007 | Bandy |
| 2007/0127693 | A1 * | 6/2007 | D'Ambrosio et al. ... 379/265.06 |
| 2008/0262928 | A1 * | 10/2008 | Michaelis ....................... 705/14 |

* cited by examiner

Primary Examiner — Thomas Dixon
Assistant Examiner — Benjamin S Fields
(74) Attorney, Agent, or Firm — William E. Schiesser; Keohane & D'Alessandro, PLLC (57) ABSTRACT

A method, system and program product for providing distribution of customer feedback pertaining to an aspect of a retail environment. The method includes creating either a text, an audio or visual tag for inputting into a tool, feedback from customers using a plurality of devices, the tag including either a product-related or a location-related tag that can be used to extrapolate on the feedback. The method further includes identifying respective locations of customers, collecting in real-time the feedback inputted by the customers and providing a user, a customer that has provided feedback or not, access to the feedback collected based on either an inquiry submitted to the tool by the user or based on a current location of the user identified by the tool. The method further includes retrieving in real-time a subset of the feedback collected based on either the inquiry submitted or the current location of the user.

15 Claims, 4 Drawing Sheets

METHOD, SYSTEM AND PROGRAM PRODUCT FOR DISTRIBUTION OF FEEDBACK AMONG CUSTOMERS IN REAL-TIME

FIELD OF THE INVENTION

The present invention relates to the field of computer systems and software, and more specifically to a method, system and computer program product for enabling distribution or sharing of feedback among customers in a retail environment, in real-time.

BACKGROUND OF THE INVENTION

In today's business environment, businesses rely on customer feedback in order to improve customer service and to maintain or increase their customer base. Typically, if a feedback or comment box exists, a customer seeking to leave feedback can leave their feedback or comments in the box. However, access to such feedback is limited and, as such, there is a need for a business and/or organization to provide a cost-effective way to access customer feedback in order to provide better customer service.

SUMMARY OF THE INVENTION

In a first aspect of the invention, there is provided a method for providing distribution of feedback in a retail environment. The method includes receiving, into a tool, feedback inputted by one or more customers using a plurality of devices that are configured to communicate with the tool, the feedback inputted pertaining to one or more aspects of a retail environment. In an embodiment, the receiving step further includes creating a respective first tag for inputting a respective feedback into the tool, the respective first tag being configured to extrapolate on the respective feedback inputted. In an embodiment, the respective first tag includes at least one of an image tag, an audio tag and a textual tag and the respective first tag includes at least one of a product-related tag and a location-related tag. The method further includes identifying, using the tool, respective locations of the one or more customers. In an embodiment, the identifying step includes tracking, using the tool, a respective location of the user for identifying a respective location of the user. The method further includes collecting, using the tool, the feedback inputted by the one or more customers pertaining to the one or more aspects of the retail environment. In an embodiment, the feedback inputted is collected and recorded in real-time. Further, the collecting step includes determining whether the feedback inputted pertains to either a product or a location within the retail environment and adding, by the tool, one or more additional tags to the feedback inputted based on the determining step in order to facilitate retrieval of the feedback collected. The method further includes providing a user access to feedback collected based on either an inquiry submitted to the tool by the user or based on a current location of the user identified by the tool. In an embodiment, the user includes at least one of a customer that has inputted feedback or a customer that has not inputted feedback. In an embodiment, the providing step further includes retrieving in real-time a subset of the feedback collected based on either the inquiry submitted to the tool by the user or based on the current location of the user identified by the tool. In another embodiment, the providing step further includes presenting the user with additional information besides the feedback collected based on either the inquiry submitted to the tool by the user or based on the current location of the user identified by the tool. In an embodiment, the aspect of the retail establishment of the one or more retail establishments includes at least one of product, service, store operation, recommendation, review, overall shopping experience and miscellaneous.

In another aspect of the invention, there is provided a system for providing distribution of real-time customer feedback. The system includes a network communications channel, one or more servers corresponding to one or more retail establishments connected to the network communications channel and to a trans-retail establishment server connected to the network communications channel, each of the one or more servers having deployed thereon a tool for distributing feedback received in real-time from one or more customers of the one or more retail establishments. The tool includes a location tracking module configured to detect a location of a customer of the one or more customers providing feedback for an aspect of a retail establishment of the one or more retail establishments, an item identifier module configured to identify one or more products in the one or more retail establishments and a collection module configured to collect in real-time, utilizing the location tracking module and the item identifier module, the feedback received in real-time from the one or more customers for the aspect of the retail establishment. In an embodiment, the tool is further configured to allow a user (a customer that has provided feedback or a customer that has not provided feedback) access to the feedback collected. The system further includes one or more clients connected to the network communications channel, the one or more clients being configured to allow input of the feedback for the aspect of the retail establishment of the one or more retail establishments, the one or more clients being configured to send inquiries from the user with respect to the one or more retail establishments, the one or more clients being configured to communicate to a server of the one or more servers a respective location of the user. Furthermore, in an embodiment, the trans-retail establishment server has deployed thereon the tool for enabling real-time distribution of the feedback collected to the user of the one or more retail establishments and to additional users of other retail establishments different than the one or more retail establishments. In an embodiment, the additional users include at least one of customers that have inputted feedback collected and customers that have not inputted feedback collected. In an embodiment, each of the one or more servers and the trans-retail establishment server further includes an input module configured to receive input of the feedback into the tool, a storage module configured to store the feedback collected and a retrieval module configured to access and retrieve the feedback collected and stored in the storage module. Further, each of the one or more servers and the trans-retail establishment server further includes an update module configured to update the feedback collected and stored within the storage module. In an embodiment, the aspect of the retail establishment of the one or more retail establishments includes at least one of product, service, store operation, recommendation, review, overall shopping experience or miscellaneous. In an embodiment, the feedback is collected using at least one tag, the tag including at least one of a text tag, an audio tag and a visual tag. Further, in an embodiment, the tag includes at least one of product-related data and location-related data.

In yet another aspect of the invention, there is provided a computer program product for providing sharing of real-time feedback among customers in a retail environment. The computer program product includes a computer readable medium, first program instructions to collect feedback pertaining to one or more aspects of a retail environment inputted by one or more customers using a plurality of devices, the first program instructions including instructions to receive a tag corresponding to the feedback inputted, the tag including at least one of an image tag, an audio tag and a text tag. In an embodiment, the tag includes at least one of product-related data or location-related data. Further, the computer program product includes second program instructions to identify respective locations of the one or more customers and to identify one or more products in the retail environment and third program instructions to search the feedback collected based on either an inquiry submitted by the user or based on a current location of the user identified, wherein the user includes at least one of: a customer of the one or more customers that has inputted the feedback and a customer other than the one or more customers that has not inputted the feedback. The computer program product according to claim 15, further includes fourth program instructions to retrieve a subset of the feedback collected based on either the inquiry submitted by the user or based on the current location identified. In an embodiment, the first program instructions include instructions to create additional tags for the feedback inputted in order to facilitate retrieval of the feedback collected and to collect the feedback in real-time. In an embodiment, the third program instructions include instructions to search additional retail information besides the feedback collected and to retrieve a subset of the additional retail information searched based on either the inquiry submitted by the user or based on a current location of the user identified. In an embodiment, the fourth program instructions include instructions to retrieve the feedback in real-time, wherein the one or more aspects of the retail environment includes at least one of: product, service, store operation, recommendation, review, overall shopping experience and miscellaneous. Preferably, each of the first, second, third and fourth program instructions are recorded on the computer recordable medium.

Further, in yet another aspect of the invention, there is provided a process for deploying computing infrastructure includes integrating computer-readable code into a computing system, wherein the code in combination with the computing system is capable of performing a process of distributing customer feedback in a retail environment. The process includes creating a tag corresponding to feedback to be inputted into a tool, the tag being configured to extrapolate on the feedback. In an embodiment, the tag includes at least one of an image tag, an audio tag or a textual tag and the tag includes at least one of a product-related tag or a location-related tag. Further, the process includes collecting by the tool in real-time the feedback inputted by one or more customers using a plurality of devices that are configured to communicate with the tool, the feedback inputted pertaining to one or more aspects of a retail environment, identifying, using the tool, respective locations of the one or more customers and identifying one or more products in the retail environment, storing by the tool the feedback collected from the one or more customers and providing a user access to the feedback stored based on either an inquiry submitted to the tool by the user or based on a current location of the user identified by the tool. In an embodiment, the user includes at least one of a customer of the one or more customers that has inputted feedback or a customer that has not inputted feedback. The process further includes retrieving in real-time by the tool a subset of the feedback collected based on either the inquiry submitted to the tool by the user or based on a current location of the user identified by the tool. In an embodiment, the collecting step further includes identifying whether the feedback inputted pertains to either a product or a location within the retail environment and adding, by the tool, one or more additional tags to the feedback collected based on the determining step in order to facilitate retrieval of the feedback collected. In an embodiment, the aspect of the retail establishment includes at least one of product, service, store operation, recommendation, review, overall shopping experience or miscellaneous.

In yet another aspect of the invention, there is provided a method of selling products to customers in a selling environment. The method includes providing, on a subscription basis, a tool to be deployed on a system utilized by a subscribed seller among one or more subscribed sellers in a selling environment, the tool being configured to catalog a plurality of products sold by a respective subscribed seller according to a respective location within the respective subscribed seller and inputting feedback using tags created by one or more customers utilizing one or more electronic devices within the respective subscribed seller, wherein the one or more electronic devices communicate the feedback inputted to the tool deployed on the system utilized by the respective subscribed seller. Further, the method includes identifying, using the tags created, respective locations of the one or more customers within the respective subscribed seller, allowing a user (either a customer that has inputted feedback or a customer that has not inputted feedback) access to the feedback collected based on either an inquiry submitted to the tool by the user or based on a current location of the user identified by the tool. Furthermore, the method includes recommending to the user one or more products based on either the inquiry submitted by the user or based on proximate locations of the one or more products to the current location of the user identified by the tool, such that the one or more products recommended to the user promote sale of the one or more products. The method further includes calculating a respective subscription fee for the tool provided to the respective subscribed seller among the one or more subscribed sellers based at least in part on usage history of the tool by the respective subscribed seller over a specified time duration. Alternatively, the method includes calculating the subscription fee for the tool provided to the respective subscribed seller among the one or more subscribed sellers based at least in part on sale history of the one or more products recommended by the tool within the respective subscribed seller over a specified time duration.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method for providing distribution of feedback in a retail environment. The method comprises receiving, into a tool, feedback inputted by one or more customers using a plurality of devices that are configured to communicate with the tool, the feedback inputted pertaining to one or more aspects of a retail environment. In an embodiment, the receiving step further comprises creating a respective first tag for inputting a respective feedback into the tool, the respective first tag being configured to extrapolate on the respective feedback inputted. In an embodiment, the respective first tag comprises at least one of an image tag, an audio tag and a textual tag and the respective first tag comprises at least one of a product-related tag and a location-related tag. The method further comprises identifying, using the tool, respective locations of the one or more customers. In an embodiment, the identifying step comprises tracking, using the tool, a respective location of the user for identifying a respective location of the user. The method further comprises collecting, using the tool, the feedback inputted by the one or more customers pertaining to the one or more aspects of the retail environment. In an embodiment, the feedback inputted is collected and recorded in real-time. Further, the collecting step comprises determining whether the feedback inputted pertains to either a product or a location within the retail environment and adding, by the tool, one or more additional tags to the feedback inputted based on the determining step in order to facilitate retrieval of the feedback collected. The method further comprises providing a user access to feedback collected based on either an inquiry submitted to the tool by the user or based on a current location of the user identified by the tool. In an embodiment, the user comprises at least one of a customer that has inputted feedback or a customer that has not inputted feedback. In an embodiment, the providing step further comprises retrieving in real-time a subset of the feedback collected based on either the inquiry submitted to the tool by the user or based on the current location of the user identified by the tool. In another embodiment, the providing step further comprises presenting the user with additional information besides the feedback collected based on either the inquiry submitted to the tool by the user or based on the current location of the user identified by the tool. In an embodiment, the aspect of the retail establishment of the one or more retail establishments comprises at least one of product, service, store operation, recommendation, review, overall shopping experience and miscellaneous.

Figure 1:
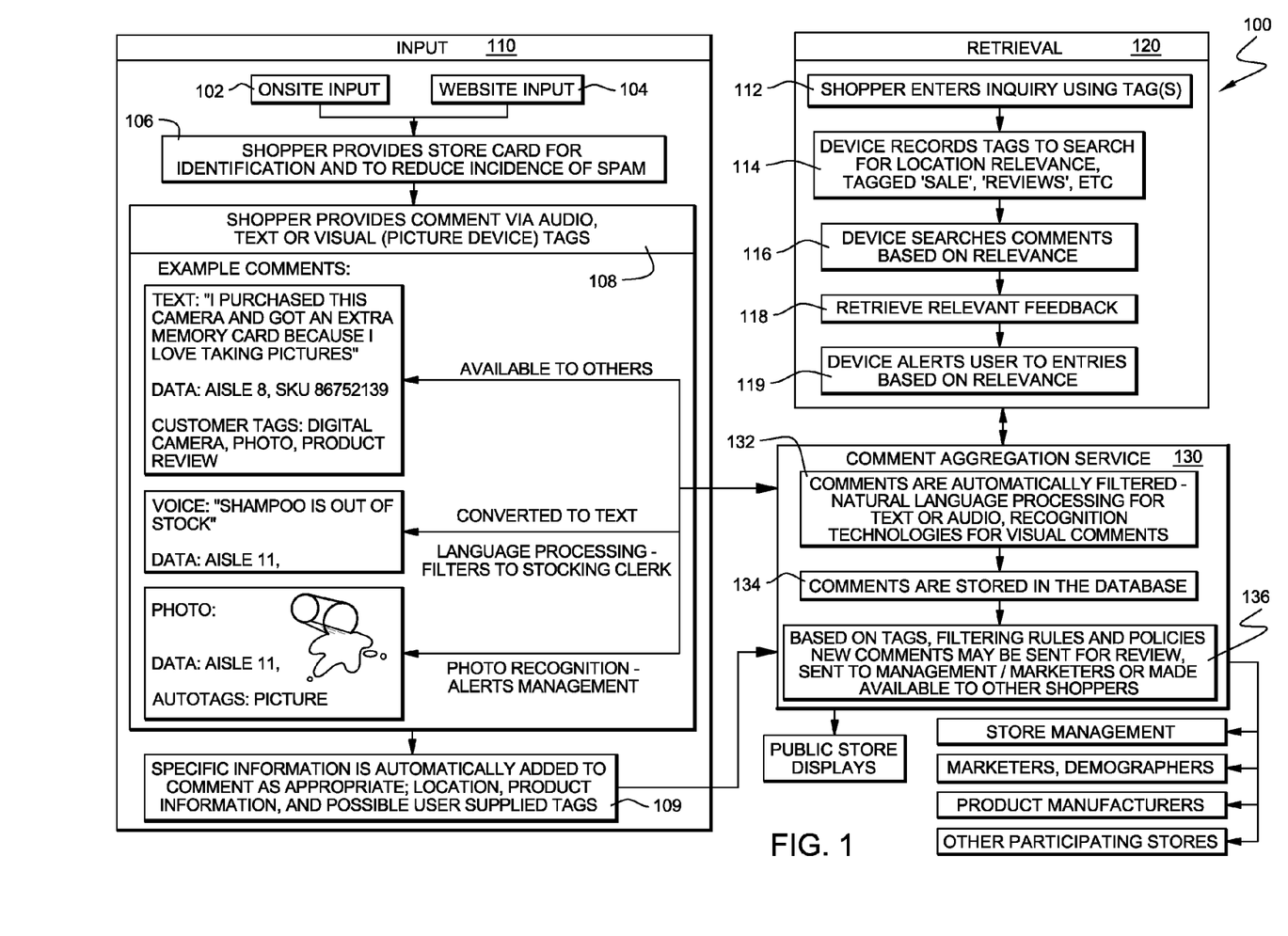
FIG. 1 depicts a flowchart which outlines the steps involved in enabling distribution of real-time feedback among customers in a retail environment, in accordance with an embodiment of the present invention.

Reference is now made to FIG. 1, which outlines the method steps involved in enabling distribution or sharing of feedback among customers in a retail environment, in accordance with an embodiment of the invention. Although the invention is often described herein below in terms of a retail environment, it is understood that the invention is applicable to any type of selling environment, such as, a retail environment, a wholesale environment or an online retail environment, where goods and/or services are sold or provided by an establishment or store. Turning to FIG. 1, numeral 100 depicts a flowchart that outlines the method steps for enabling or providing distribution or sharing of feedback received from one or more customers to all customers in a retail environment. In an embodiment, a "retail environment" may refer to a physical store or a chain of stores or a group of unrelated stores that provide goods and/or services for sale. Turning to the left side of FIG. 1, FIG. 1 depicts the input or providing of customer feedback into a system (represented by reference numeral 110). In particular, a shopper or customer may provide either onsite input or feedback 102 while the user is at a store location, for instance, using a commercially available electronic shopping device or system, such as, the Shopping Buddy® computerized in-store shopping system, which in part tracks customer location as it is moved through the store along with the shopper and is capable of communicating to a retail establishment feedback tool or code or program (discussed further herein below with respect to FIGS. 2 and 3) having a back-end database maintained by or for the retail establishment or store. Alternatively, a user may provide website input or feedback 104, for instance, at a location other than within a store, such as, from home using a computer or a cell phone or a PDA (Personal Digital Assistant) via the Internet to access the retail establishment feedback tool deployed on a server or system employed by a store to provide distribution or sharing of feedback among customers of the store. In particular, the retail establishment feedback tool is deployed on a system employed by a store to allow customer feedback to be inputted in real-time within a store or to be inputted via a website, so that the feedback is provided or made available to all customers and/or management. In one embodiment, as shown in step 106, the customer or shopper or customer is prompted to enter identification information in order to reduce incidence of spam. In an embodiment, the identification information comprises a customer identification number, such as, the number provided on a store card to the customer. It is understood by one skilled in the art that other types of information can be used for identification purposes, such as, an e-mail address or authentication information, such as username and password. Accordingly, the customer enters or provides the identification information in step 106 in order to access the retail establishment feedback tool for inputting the feedback. Further, in step 108, the customer provides or inputs feedback or comments into the feedback tool using tags. In particular, the customer creates or selects an "extrapolative tag", such as, an image tag (also referred to as a visual tag or a video tag), an audio tag (also referred to as a voice tag) or a text or textual tag for the input of the feedback. As used herein the term "extrapolative tag" refers to a tag that enables the system to reach out or to extrapolate, in a progressive or ever-expanding manner, for information relating to a consumer comment or feedback. For instance, an image tag can provide content-based feedback and/or location-based feedback, allowing the system to extrapolate on the feedback provided. The extrapolation may be done automatically or on-demand by the tool, as explained herein below. Further, the extrapolative tag provides data or information as to whether the feedback inputted pertains to a product and/or a location. Although, a comment or feedback may contain geographic or location data, if the location is not relevant to the comment or feedback, for instance, "This camera's great", then a location tag may not be included or associated with the comment. Accordingly, as shown in 108 of FIG. 1, a customer may choose to create a text or textual tag ("I purchased this camera and got an extra memory card because I love taking pictures") for providing or inputting feedback or comments relating to a camera purchase into the retail establishment feedback tool. The comment or feedback is automatically added to a comments or feedback database or repository employed by the tool for storing feedback received from one or more customers or shoppers. The textual tag provides information, for instance, that the feedback pertains to a product for facilitating retrieval of the feedback. Further, a customer or shopper may supply or create additional tags, besides the initial tag created. For instance, a customer may also create in addition to a text tag, an audio tag, by recording a voice message "I purchased this camera and got an extra memory card because I love taking pictures". Further, the customer may also create a visual tag in addition to the text tag and/or audio tag, such as, an image or picture of the camera and a memory card. Referring to FIG. 1, the same customer may input additional feedback or a different customer may input feedback into the tool by using a voice tag. For example, a customer can leave a message informing store personnel that a certain shampoo in a certain aisle is out of stock. Similarly, a customer may input feedback using a visual tag (photo or video) to alert the store personnel of a spill in a certain aisle of the store. As such, a customer can provide additional text tags, such as, "for management" tag or "for stocking clerks" tag, etc. in order to help the system extrapolate (explained further herein below) to whom messages should be routed. In an embodiment, the feedback is updated or added into the tool in step 109. In particular, in an embodiment, the tool automatically creates or assigns additional tags and/or adds data to the feedback inputted and stored within a retail system in order to facilitate retrieval of the feedback. For example, additional textual tags or image tags may be added based on contents of the comment inputted to identify a specific store (store number or picture of a store), a particular aisle within the store, product information (for instance, a specific SKU (Stock Keeping Unit) number for a product or RFID (Radio Frequency Identification) tag identifying a product or a brief description of the item or product, etc. Accordingly, if a retail system receives a picture sent by a customer, the customer may not have to define the tag as a photo tag. Similarly, if a Shopping Buddy® computerized in-store shopping system is used, the device can automatically fill out an SKU tag when the customer scans the item, the device being configured to know what item the customer is standing in front of or what aisle the customer is in and does not need the customer to provide an input of "spill in aisle 5", but the customer can simply input "spilled milk" and the device can tag the comment as appropriate. Further, comments or feedback inputted may have associated with them data or information based on the customer's categorizations, for instance, "store operations", "product comments", "overall experience", "recommendations", "reviews", etc., such that the tool can automatically assign tags to a comment or feedback entered into the system. Furthermore, the text, voice or visual tags representing the feedback inputted may also be processed with natural language capabilities or algorithms in order to help filter and categorize the input. For example, a comment containing the term "spill" may cause the system to add a text tag regarding distribution of the comment, such as, a "for management" tag, so that another system could search on this tag and notify store personnel to take action. Additionally, the tool may add metadata (embedded data) for a customer's comments that are entered into the tool, where the metadata may include embedded data, such as, a store location (city, state, etc.) or GPS (Global Positioning System) coordinates (if a customer is using a GPS-enabled device), so that, for example, an aisle number at different stores can be differentiated. As such, metadata facilitates the narrowing down of a search to a particular store or area based on a customer's location. Thus, if another customer inquires as to the camera having the same SKU, the system may first retrieve relevant information that others may have deposited while in the same aisle or store that the consumer is currently in. Further, the system may then retrieve relevant information from other stores in the same chain of stores and/or, additionally, retrieve information from other unrelated stores. Moreover, the system may also go beyond stores and retrieve information from other information resources, such as, the Web (e.g., the Google website, which includes access to books, newsgroups, news, and a variety of other information sources). As such, the "radius" of an extrapolation or the extent to which the system searches for relevant information may be controlled in various manners. For example, the consumer may specify the radius by requesting only information that other consumers have left in the current store aisle. Alternatively, the radius may be determined automatically. For example, a history of a consumer's radii may be used to determine the most likely preferred radius to use for the current invocation. Alternatively, a history of radii used by many different customers seeking information on a particular product (or in a particular store) may be used to determine the most likely preferred radius to use for the current invocation. Tagged comments may allow a customer to notify the store staff about a location which needs cleaning, a product that is out of stock, other suggestions, recommendations and/or the ability for a customer to freely express their comments or feedback without following any predefined topics. More specific tags may also be left for family and friends (or even oneself), for instance, suggestions for gift ideas. Accordingly, customers can make real-time comments while still at the location where their observations are relevant, and where the comments are automatically entered into the store's systems and stored into a feedback database, which other consumers, including staff, management, marketers, distributors, etc. can access and review. As such, a consumer can add his comments in addition to retrieving and viewing other customers' comments that are relevant to the consumer's current shopping content or location. The feedback distribution mechanism generates not only a location-sensitive message board or discussion forum, but promotes a sense of community beyond consumer interactions bound by locality. Thus, with extrapolative tags, a customer is able to not only access what information has been provided by other customers about a specific product in a particular location, but can explore product-specific tags created by customers at other locations as well. In particular, as shown in FIG. 1, the retail establishment feedback tool provides a comment aggregation service, reference numeral 130. In particular, the comments entered by the customer in step 108 are automatically filtered in step 132. In an embodiment, natural language processing may be utilized for text or audio comments, whereas, recognition technologies may be used for image or visual comments. Further, the comments entered are stored in a database in step 134. The comment database may contain such information as customer comment, in the form of text, audio or visual input, along with any associated product and product location information. As such, comments can be translated from image, speech or text to an appropriate medium for accessibility beyond one particular method. Furthermore, in step 136, based on the tags, filtering rules and/or policies employed by a system, new comments entered into the system may be sent for review, sent to store management, sent to marketers, demographers, product manufacturers and/or made available to other shoppers at other participating stores. For instance, messages concerning "spills" can be directed directly to the cleaning staff, whereas, "out of stock" issues can be directed to the stock clerk. Further, the comments may also be made available to customers or shoppers via public store displays (screen displays) or product set-ups located in prominent high-traffic locations in a store. Large displays and product set-ups in prominent locations can increase the rate of sales when compared to the same items sold from their regular shelf locations in an aisle. Moreover, such information can be made anonymous by collecting aggregate information (such as comments over a period of time) and displaying this aggregate via public store displays.

In addition to entering feedback, a customer or shopper may also retrieve information or feedback stored in the system (represented by reference numeral 120 on the right hand side of FIG. 1). As such, a customer or shopper may enter in step 112 an inquiry into the system using one or more tag(s), that is, text tags, audio tags and/or visual tags. The system records any included tag(s) in step 114 in order to search feedback pertaining to the relevant tags. In step 116, the system searches the comments or feedback stored in the system database based on relevance and in step 118, the system retrieves the relevant feedback corresponding to the inquiry entered by the customer or shopper. The system alerts the customer of the entries based on relevance in step 119. Alternatively, the tool may automatically search comments entered by other users based on a customer's location within a store, for instance, the tool may provide all stored comments pertaining to products in a particular aisle that a customer is shopping in. As such, a customer or shopper may not only enter feedback or comments using the retail establishment feedback tool, so that the comments or feedback are made available to all users, but may also retrieve comments or feedback provided by other users or shoppers. Accordingly, the method provides the capture of feedback or comments in geographically-sensitive contexts as well as the display or retrieval of comments in geographically-sensitive contexts, and not just limiting the feedback or comments to product commentary, but also allowing store comments, pricing comments, inquiries or questions and other such related and valuable inputs from customers. Moreover, topic and location tags allow information to be filtered contextually, and information can move beyond product commentary to provide situational assistance as well. As such, consumers may feel more empowered to make decisions based on peer review and feedback. Further, management can gain insight into buying behaviors which can reveal valuable information to help, for instance, marketers shape marketing strategies. Additionally, store owners can monitor and respond to operational concerns much faster, e.g. spills and stocking issues, or any difficulties or frustration with the shopping experience as expressed by consumers, which can promote enhanced customer service and customer loyalty. For example, an extrapolative tag system can identify that a customer is trying to buy a digital camera and then by deductive searches find beneficial data, for instance, displaying to the customer or user a list of the highest rated digital cameras. Further, the extrapolative tag system can realize from the comments searched within the system that other users or customers suggested buying bigger memory cards or extra batteries and can direct a user to current sales offerings in a store that combine the two or can identify nearby stores or online web sites where the customer can purchase the combination of items, if not offered within the store a customer is in. Accordingly, an extrapolative tag environment (both the physical systems as well as the emergent use of such systems) provides the ability to identify relevant information even if intrinsic relationships are not mapped by explicit rules.

In an embodiment, the location of a shopper within a store for tag creation or tag retrieval may be detected by retailers by providing a commercially available electronic shopping device or system, such as, the Shopping Buddy® computerized in-store shopping system (using radio frequency (RF) technology), which in part tracks customer location as it is moved through the store along with the shopper and is capable of communicating to a feedback tool that include a database maintained by or for the retail establishment or store. The Shopping Buddy® computerized system is commercially available from the Switzerland based corporation, Ahold Licensing SA. Alternatively, a customer may use any Internet-enabled multimedia device or any wireless device or any smart device that can aid shoppers with inputting feedback and that can communicate wirelessly with a store's system. Further yet, retailers or sellers may utilize optical (e.g., infrared) signals detectable by wireless computerized devices attached to shopping carts or SKU-scanning attachments to wireless computerized devices attached to shopping carts to ascertain a customer's position in a store. In another embodiment, GPS (Global Positioning System) can be used with customers' mobile devices, e.g., cell phones, for detecting the location of a customer based on their mobile device-reported GPS coordinates by triangulating on the GPS signal coming out of the device. If a GPS signal is not available, a store may provide sensors within the store for picking up cell phones. Moreover, kiosks (whose locations are known) can be provided at predetermined locations for ascertaining a customer's position. Further, a customer can create and/or retrieve tags in a retail environment by utilizing the Shopping Buddy® computerized system provided by a store or other similar shopping devices using wireless technology to create and/or retrieve a text tag, an audio tag and/or a visual (photo or video) tag. Similarly, customers can use kiosks to create and/or retrieve a text, audio or visual tag.

In another embodiment, the invention provides a system for providing distribution of real-time customer feedback. The system comprises a network communications channel, one or more servers corresponding to one or more retail establishments connected to the network communications channel and to a trans-retail establishment server connected to the network communications channel, each of the one or more servers having deployed thereon a tool for distributing feedback received in real-time from one or more customers of the one or more retail establishments. The tool comprises a location tracking module configured to detect a location of a customer of the one or more customers providing feedback for an aspect of a retail establishment of the one or more retail establishments, an item identifier module configured to identify one or more products in the one or more retail establishments and a collection module configured to collect in real-time, utilizing the location tracking module and the item identifier module, the feedback received in real-time from the one or more customers for the aspect of the retail establishment. In an embodiment, the tool is further configured to allow a user (a customer that has provided feedback or a customer that has not provided feedback) access to the feedback collected. The system further comprises one or more clients connected to the network communications channel, the one or more clients being configured to allow input of the feedback for the aspect of the retail establishment of the one or more retail establishments, the one or more clients being configured to send inquiries from the user with respect to the one or more retail establishments, the one or more clients being configured to communicate to a server of the one or more servers a respective location of the user. Furthermore, in an embodiment, the trans-retail establishment server has deployed thereon the tool for enabling real-time distribution of the feedback collected to the user of the one or more retail establishments and to additional users of other retail establishments different than the one or more retail establishments. In an embodiment, the additional users comprise at least one of customers that have inputted feedback collected and customers that have not inputted feedback collected. In an embodiment, each of the one or more servers and the trans-retail establishment server further comprises an input module configured to receive input of the feedback into the tool, a storage module configured to store the feedback collected and a retrieval module configured to access and retrieve the feedback collected and stored in the storage module. Further, each of the one or more servers and the trans-retail establishment server further comprises an update module configured to update the feedback collected and stored within the storage module. In an embodiment, the aspect of the retail establishment of the one or more retail establishments comprises at least one of product, service, store operation, recommendation, review, overall shopping experience or miscellaneous. In an embodiment, the feedback is collected using at least one tag, the tag comprising at least one of a text tag, an audio tag and a visual tag. Further, in an embodiment, the tag comprises at least one of product-related data and location-related data.

Figure 2:
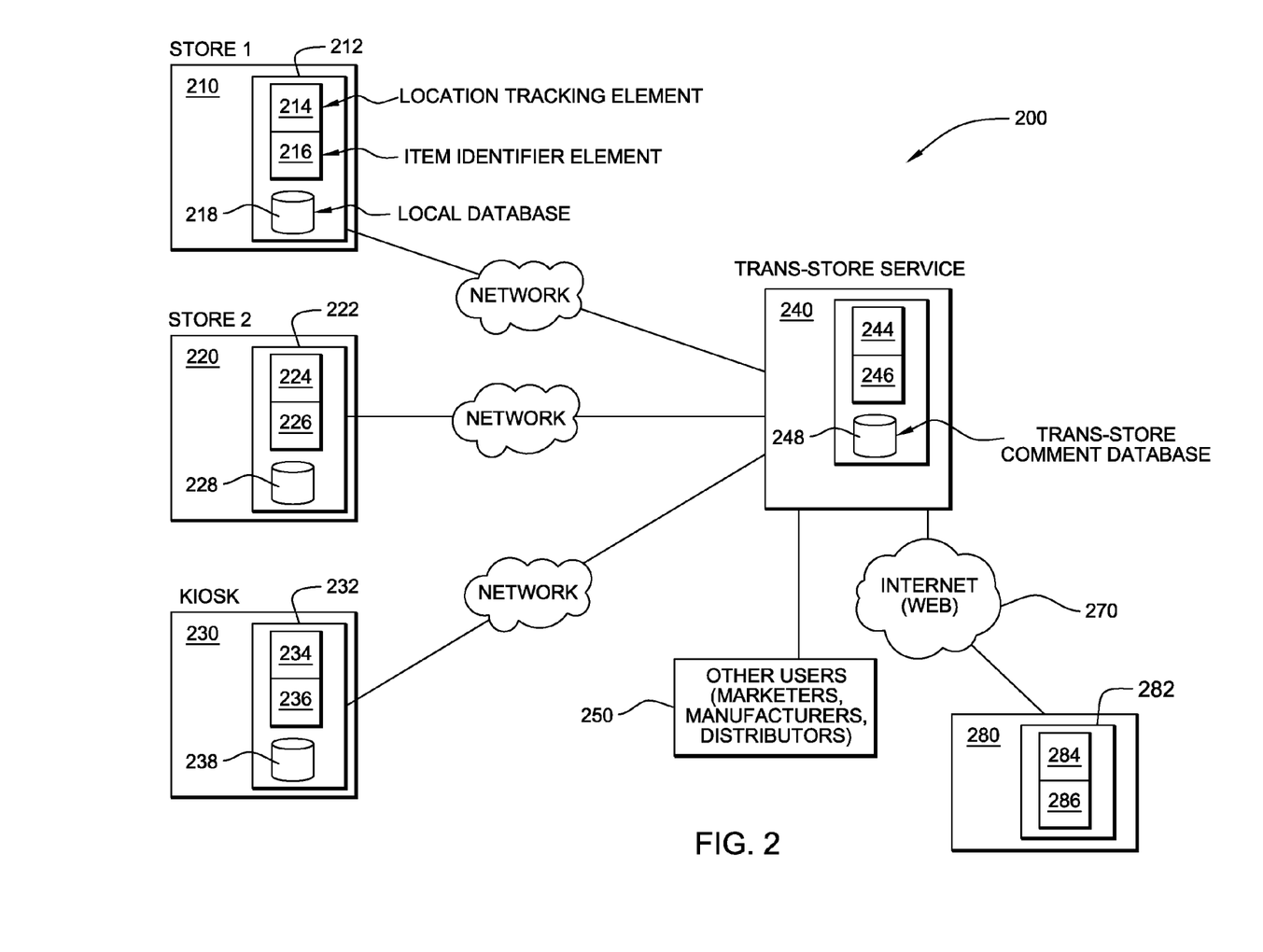
FIG. 2 is a schematic block system diagram illustrating an embodiment of a system for enabling distribution of real-time feedback among customers in a retail environment, in accordance with an embodiment of the present invention.
Figure 3:
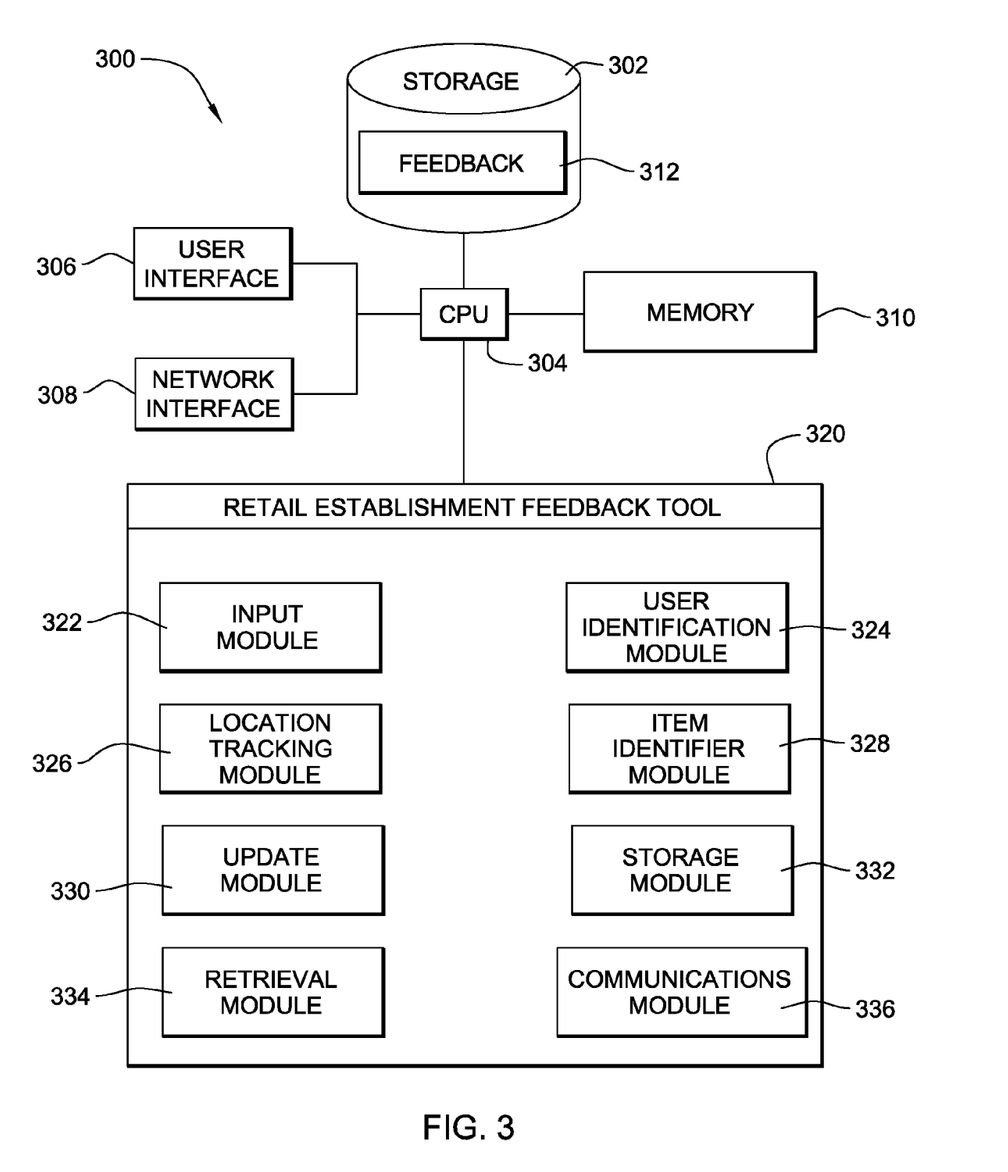
FIG. 3 is a schematic block system diagram illustrating an embodiment of a retail establishment feedback system for distributing or sharing of feedback received from one or more customers to all customers in a retail environment, in accordance with an embodiment of the invention.

Reference is now made to FIGS. 2 and 3, which illustrate various embodiments of a retail or shopping feedback system for providing distribution or sharing of feedback in real-time among customers in a retail environment. Turning to FIG. 2, reference numeral 200 provides a schematic block diagram of an embodiment of a system 200 for distribution or sharing of feedback among customers in a retail environment. The system 200, in an embodiment, is a distributed system that comprises of one or more servers and clients that are connected on a network via a network communications channel to a trans-store service server 240, such that, if a customer at store 1 queries the content stored in server or system 210, then that system 210 could reference the trans-store service server 240 or the server 210 can query multiple distributed sites, such as, servers 210, 220 and 240. In an embodiment, server 210 (representing store 1), server 220 (representing store 2), server 230 (representing a kiosk) and trans-store service server 240 are each connected on the network, such that, a customer or shopper at a particular store, for instance store 1 can utilize the respective server 210 for providing feedback that is collected by server 210 and the trans-store service server 240, so that the feedback is made accessible to all users of the system 200. As shown in FIG. 2, a customer can not only access the system 200 while within a store, but can also access the system 200, using a server on the network, but at a separate location, such as server 230, for instance, a kiosk set up at a separate location for a retail establishment. Furthermore, a customer or user can access the system 200 via the Internet 270 using a client 280, such as, a wireless Internet-enabled device, such as, a computer workstation at home or a mobile device, such as a laptop, a cell phone, a PDA, etc. As shown in FIG. 2, each of the servers 210, 220, 230 and 240 as well as client 280 has deployed thereon a retail establishment feedback tool (reference numerals 212, 222, 232, 242 and 282, respectively) that is configured to enable distribution or sharing of the feedback collected among customers in a retail environment. Alternatively, instead of the client 280 having the retail establishment feedback tool 282 deployed thereon, a customer at the client may access an appropriate website for a retail establishment using the Internet 270, which may, in an embodiment, prompt the customer for identification information before being able to enter comments that are stored in the trans-store comment database 248. In particular, a shopper or customer can provide feedback at a particular store or from a kiosk, which is collected and stored locally in a database and is further sent to the database 248 located on the trans-store service server 240 that has deployed thereon the retail establishment feedback tool 242 configured to provide a service of distributing or sharing the feedback collected to other users (reference numeral 250), for instance, a different store chain from the store chain using the retail feedback system, and to other clients, such as, client 280, so that the feedback can be distributed to or accessed by additional users located external to the store. Accordingly, other users or customers at other stores as well as marketers, manufacturers and/or distributors can all access the feedback stored within the trans-store service server 240. Moreover, the feedback collected by the trans-store service server 240 can be published over the Internet (Web), reference numeral 270, so that the feedback can be made available to yet another group of users or customers using wireless Internet-enabled mobile devices, such as cell phones, PDAs, laptops, etc. Further yet, in an embodiment, in response to an inquiry received from a customer, the trans-store service server can access the Internet (Web) to obtain additional relevant information to provide to a customer inputting a query into the feedback system. In an embodiment, the retail establishment feedback tool deployed on each of the servers 210, 220, 230, 240 and client 280 each comprises (among other components, described herein below with respect to FIG. 3) a location tracking element (reference numerals 214, 224, 234, 244 and 284, respectively), an item identifier element (reference numerals 216, 226, 236, 246, and 286, respectively). The location tracking element is configured to track the location of a customer, so that any feedback gathered can be organized or categorized based on location. In an embodiment, the location can be location of a particular store among several stores in a store chain or can be location of an aisle in a particular store, etc. Further, in an embodiment, the item identifier element is configured to identify any items or products (using the SKU number) contained in a feedback entered by a shopper, such as, an image tag. Furthermore, in an embodiment, the servers 210, 220, 230 each comprises a storage or database (reference numerals 218, 228 and 238, respectively) for storing the feedback collected from one or more customers at one or more stores. Additionally, comments may be stored in a distributed system, such as, server 240, such that, a customer at store 1 can not only query store 1 and store 2, but can also query the trans-store server 240, which comprises a storage or database (reference numeral 248) for storing the feedback or comments collected not only from server 210 and server 220, but also from the kiosk server 230 and other clients, such as, client 280. Accordingly, feedback provided by shoppers or customers can be stored both locally within a store's server that can be accessed by other users in the same store and/or centrally within the trans-store service server 240 that can be accessed by other users in other stores, as described herein above with respect to FIG. 1.

For example, a customer who wants to enter a general comment about a spill in one of the aisles in the store can go to a nearby kiosk and enter a comment "spill on aisle 5" and tag it "for_management" or "cleanliness", and the store management team would have a system to search on these (and other likely tags). Alternatively, a customer may use the Shopping Buddy® computerized in-store shopping system and type in the phrase "spill" as feedback, and the wireless device deduces that that customer is in aisle 5. Similarly, a customer may take a picture of a spill with a cell phone camera, which could add in location information to the picture's metadata and e-mail the picture to an e-mail address. The receiving feedback system saves the attachment and parses out the GPS coordinates from the picture image and adds this as an informational tag (so customers or users can search all comments by physical location). Further, some other computer vision algorithms may deduce that the customer is in aisle 5 (for example, it sees all the bottles of soda) and figures out that the comment concerns a cleanup issue since the picture is of the floor with a mess on it. As such, the system may add additional tags that it deems appropriate. Similarly, if a store provides a wireless shopping device with a scanner, the customer uses the wireless shopping device to enter comments on a product. The customer scans the product using the scanner provided by the wireless shopping device and a screen pops up displaying the bar code, product description, price, aisle information, store identifier, etc. In an embodiment, the screen may also present the customer with an option of providing/adding a comment so that the customer can click on that particular option to provide a comment. Or the customer can take a picture of the barcode with a cell phone and e-mail the picture to an address with some text in the body saying "this is really cheap!!!".

Additionally, if a store provides a wireless shopping device with a location detection capability, such as, the Shopping Buddy® computerized in-store shopping system, the customer can type in a text tag "shampoo" and then a screen with options may pop-up that provides the customer with an option of reviewing all comments linked to that tag in that store and perhaps even offer options to display comments pertaining to that tag beyond that store. Alternatively, a user or customer can access a web page for the retail store and can query the tags, for instance, search on "digital camera" or by an SKU number or a customer can search by all sales in a particular store, for instance, the customer inputs "sales" and "Store X" in the search box, or enters appropriate GPS coordinates. At a store itself, a customer can use a location tracking device, such as the Shopping Buddy® computerized in-store shopping system, which knows what aisle a customer is in and could be configured to show the customer relevant product information as the customer walks through the store, such as, "check out the special on potatoes". Further, a customer may also use a cell phone and enter tags to search on either to get a response to a particular query or to get text messages when new comments show up. For instance, you could use the Google® search engine (owned by Google Inc.) via SMS (Short Message Service) to query prices on items and to get feedback provided by other customers.

For example, a customer can enter or retrieve comments from a cell phone. There may be an e-mail address or SMS number (or both) and depending on a cell phone's capabilities (if capable of browsing the web directly), a customer can send a query, such as,. "search digital_camera sale reviews". Alternatively, to submit a comment, a customer would take a picture of the barcode and send it as picture mail along with a text comment "bought this yesterday and it sucks". For instance, cell phones with Instant Messaging capabilities would allow communications, such as, browsing the web directly, picture mail capabilities, instant messaging capabilities, etc. Or the store could simply have a sign with "call this number to participate in our commenting system" and it could be done via voice recognition (or even a real live person on the other end). Some PDA's have e-mail capability, so the process would work similar to a cell phone. Or if the PDA did not have full wireless capabilities, then it would queue the comment and mail it when the user syncs the PDA device. Alternatively, a user could make real time queries while online and the user could synchronize the results (or synchronize a small subset of the database which is query-able while offline). A user could build a commenting system where a user uses Google® Maps online map service and location finder (provided by Google Inc.) to search and identify the store and then enters additional comments. Furthermore, a user can take a picture of the store itself and comment on the store in general and either manually tag it with "Store X" or rely on a computer algorithm to identify the logo. If it's a restaurant, a user can take a picture of the sign (video tag) and input "great food" (text tag) and then submit that comment to the store's system. Additionally, in an embodiment, via some additional automated tagging, that review comment can be entered into other web sites, for instance, web sites that provide ratings for restaurants.

Reference is now made to FIG. 3, which illustrates an embodiment of a system for enabling distribution of real-time feedback received from customers to all customers in a retail environment, such as, a retail environment. Turning to FIG. 3, FIG. 3 is a schematic block system diagram illustrating one embodiment of a system or server 300, such as, a server employed in a retail environment that has deployed thereon a retail establishment feedback tool or program or component 320 (also referred to herein as shopping feedback tool or feedback tool or simply as "tool"), the shopping feedback program or component or tool 320 being configured to enable distribution or sharing of real-time feedback received from a customer to all customers in a retail environment, in accordance with an embodiment of the invention. Preferably, the system 300 is a server, for instance, a server employed in a retail environment that includes a central processing unit (CPU) 304, a local storage device 302, a user interface 306, a network interface 308, and a memory 310. The CPU 304 is configured generally to execute operations within the system/server 300. The user interface 306, in one embodiment, is configured to allow a user, such as, a customer, to interact with the system 300, including allowing input of feedback and or questions and/or comments from a user and communicating output data, such as, replies to the questions and/or inquiries received from the user. The network interface 308 is configured, in one embodiment, to facilitate network communications of the system 300 over a communications channel of a network (as shown in FIG. 2). In an embodiment, the feedback 312 collected and/or comments received from users is stored in storage system 302. Alternatively, the feedback 312 may be stored in memory 310 or in a separate storage.

In one embodiment, as shown in FIG. 3, the feedback program or retail establishment feedback tool 320 which runs on the retail server or system 300 comprises a logic unit that contains a plurality of modules configured to functionally execute the necessary steps of enabling sharing or distribution of feedback collected from one or more users to all users. In particular, the shopping feedback tool 320 includes an input module 322, a user identification module 324, a location tracking module 326, an item identifier module 328, an update module 330, a storage module 332, a retrieval module 334 and a communications module 336. The input module 322 is configured to receive input from one or more users, such as, customers. In an embodiment, the user identification module 324 is configured to identify and/or authenticate a user seeking access to the retail server for providing feedback and/or seeking feedback from other users. In an embodiment, the user identification module 324 identifies a user by requesting an account number printed on a store card provided to a user by a store. Similarly, a user may be identified by their e-mail address inputted into the tool or a user may be prompted to enter a username and password. Further, such information may be used to create profiles for customers, for instance, a geographic location where a shopper or customer shops, customer demographics, how often a customer purchases a certain product, etc. The location tracking module 326 is configured to identify location of a user inputting feedback into the feedback tool 320 and/or requesting feedback from the feedback tool 320. By identifying a location of the user, the feedback tool 320 can provide feedback that is relevant or pertinent to that specific location or feedback pertinent to retail stores within a certain radius of the user's location. Further, the item identifier module 328 is configured to identify any products associated with a feedback inputted or provided by a user. Further, in an embodiment, the item identifier module 328 is configured to identify the type of information or contents of the inputted feedback pertaining to a product that is provided by a user. The update module 330 is configured to record and/or update information inputted by a user into the retail establishment feedback tool 320. In an embodiment, the update module 330 utilizes data or information gathered by the location tracking module 326 and the item identifier module 328 for adding additional tags or data or metadata to the feedback collected into the retail establishment feedback tool 320. Furthermore, the storage module 332 is configured to store the feedback 312 collected in a storage, such as, in storage or database 302. Alternatively, the feedback 312 may be stored in a storage or database system external to the server 300. In an embodiment, the storage module 332 stores the feedback 312 collected based on tags supplied by a user, which facilitates grouping of the feedback or information provided by a user, for instance, using location-content or product-content provided in the tags. Additionally, the retrieval module 334 is configured to search the storage 302 for feedback stored or recorded within the server 300 and/or external to the server 300 based on an inquiry or question received from a user. In an embodiment, the tool 320 utilizes the content and/or location supplied in the tags by a user to retrieve relevant information. Further, the communications module 336 is configured to permit communication between the various modules of the retail establishment feedback tool 320 and other components, such as, the storage 302, which contains the feedback 312 that is recorded and/or the other modules within the retail establishment feedback tool 320.

For example, if a store provides detachable wireless devices with a bar code or a RFID scanner and a display attached to a wireless shopping cart or device, such as, a Shopping Buddy® computerized in-store shopping system, then the tagging capability can be added to the existing wireless devices, for instance, either by adding a comment option in the touch screen display of the device or by attaching a microphone to the device to enable the customer to record feedback or comment. In an embodiment, only users who can provide identification (such as, store cards) may use the system in order to reduce spam and to encourage customer loyalty. As such, stores may correlate comments or feedback with particular customers or with customer demographics. Further, such wireless shopping devices with a bar code scanner or a RFID scanner can allow a customer to scan an item's bar code or RFID code and then enter or record any comments on a keyboard (or audio input/output device) on the wireless shopping device. Furthermore, comments may also include typed questions, such as: "Does anyone know if MSG (monosodium glutamate) in this soup causes headaches?" or verbal comments, such as, "The oranges are more expensive here. At A&B the oranges are only $1.99 per pound." The customer would 'hit' end on the touch screen display to complete the recording. Voice messages recorded can be translated into text messages and associated with the customer's current food section into the system. Further, keypads may be distributed throughout the store along aisles so that users may enter general information unrelated to a particular product, for example, "Aisle 7 is a mess." Information may be projected on large displays so that other users and store employees may see a selection of commentaries. If desired, smart filters may be applied so that only some messages are projected. These wireless shopping devices may have text, voice and/or video input capabilities, and can be enhanced to provide commenting capabilities. Further, the wireless device can be enhanced with audio replay features. For instance, the consumer can scan a product either with a RFID code or a bar code and/or can select a "review comments" feature on the display. Accordingly, all the comments or feedback related to the selected product, location, or specific tags, would be displayed for the consumer. If the wireless shopping device is equipped with location tracking device and a consumer wants to review any geographically-specific (geo-specific) or geographically-sensitive (geo-sensitive) comments, the consumer may just hit the "review geo-specific tags" feature in order to display any comments that are relevant to the consumer's current location. Furthermore, various approaches can be taken to implement a tagging system in traditional stores that do not have any location sensing system. These stores can establish dedicated comment and review kiosks, which consumers can use to record their messages for a particular product, make remarks on certain aspects of the store, and/or any comments that the consumer would like to provide. These kiosks can be located at any convenient location for consumers, or the store can set multiple kiosks near particular items. In an embodiment, each comment is stored with a subject or brief description to facilitate indexing and searching of the message by others. The recording of voice messages can be further transcribed to written form for people to read at kiosks. In one embodiment, the comments are left for store management only. In another embodiment, consumers can read each others comments.

In yet another embodiment, the invention provides a computer program product for providing sharing of real-time feedback among customers in a retail environment. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to collect feedback pertaining to one or more aspects of a retail environment inputted by one or more customers using a plurality of devices, the first program instructions including instructions to receive a tag corresponding to the feedback inputted, the tag comprising at least one of an image tag, an audio tag and a text tag. In an embodiment, the tag comprises at least one of product-related data or location-related data. Further, the computer program product comprises second program instructions to identify respective locations of the one or more customers and to identify one or more products in the retail environment and third program instructions to search the feedback collected based on either an inquiry submitted by the user or based on a current location of the user identified, wherein the user comprises at least one of: a customer of the one or more customers that has inputted the feedback and a customer other than the one or more customers that has not inputted the feedback. The computer program product further comprises fourth program instructions to retrieve a subset of the feedback collected based on either the inquiry submitted by the user or based on the current location identified. In an embodiment, the first program instructions include instructions to create additional tags for the feedback inputted in order to facilitate retrieval of the feedback collected and to collect the feedback in real-time. In an embodiment, the third program instructions include instructions to search additional retail information besides the feedback collected and to retrieve a subset of the additional retail information searched based on either the inquiry submitted by the user or based on a current location of the user identified. In an embodiment, the fourth program instructions include instructions to retrieve the feedback in real-time, wherein the one or more aspects of the retail environment comprises at least one of product, service, store operation, recommendation, review, overall shopping experience and miscellaneous. Preferably, each of the first, second, third and fourth program instructions are recorded on the computer recordable medium.

Figure 4:
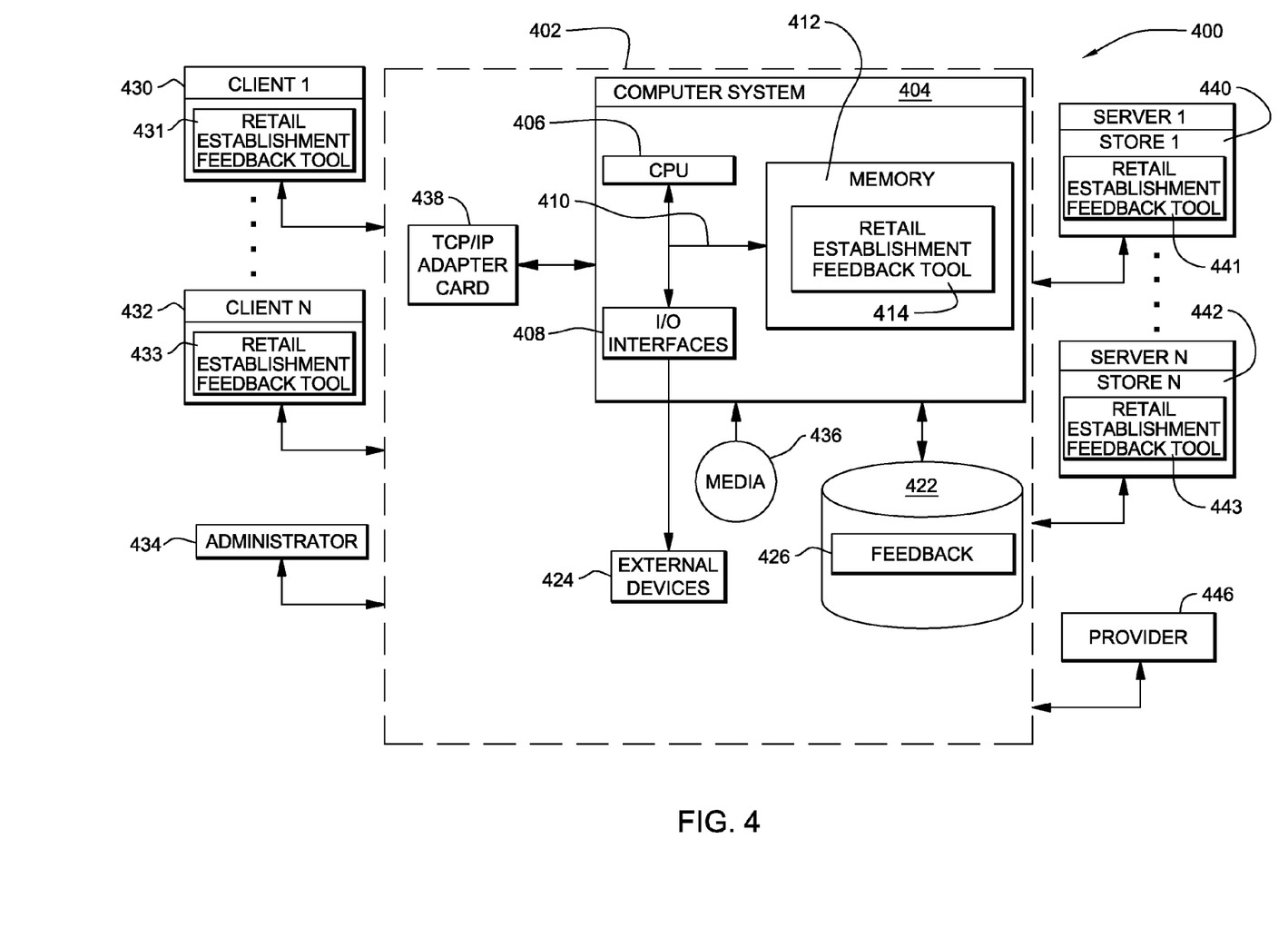
FIG. 4 is a schematic block system diagram illustrating an embodiment of a computer infrastructure for enabling distribution or sharing of retail information, including feedback received from one or more customers, to all customers in a retail environment, in accordance with an embodiment of the invention.

Referring now to FIG. 4, there is illustrated a system 400 that provides a computer program product for distributing retail information, including feedback received from one or more customers, to all customers in a retail environment, in accordance with an embodiment of the present invention. The computer program product comprises a computer readable or computer-usable medium, which provides program code namely, the retail establishment feedback code or tool 414 (referred to herein below as "feedback tool"), for use by or in connection with a retail establishment computer or system or any instruction execution system. The feedback tool or program 414 can be loaded into the server or system 404 from a computer readable media 436, such as, a magnetic tape or disk, optical media, DVD, memory stick, semiconductor memory, etc. or downloaded from the Internet via a TCP/IP adapter card 438. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a server 404, for instance, a retail server or a shopping server or the like configured to enable distribution or sharing of real-time feedback received from customers to all customers in a retail environment, the server 404 being accessed by a client (e.g., a personal computer, a laptop, a handheld device, etc), for instance, a user at a client 430. It should be understood, however, that although not shown, other hardware and software components (e.g., additional computer systems, routers, firewalls, etc.) could be included in infrastructure 402.

In general, one or more devices, for instance, one or more servers utilized by individual shopping stores, for instance, retail stores (for instance, store 1, reference numeral 440, through store N, reference numeral 442) and one or more clients (for instance, client 1, reference numeral 430, through client N, reference numeral 432) are connected via a network to shopping infrastructure 402, which includes a retail establishment feedback tool 414 configured to enable distribution or sharing of real-time feedback received from one or more customers to all customers in the shopping infrastructure 402. As shown in FIG. 4, each of the retail servers employed by stores 1 through N as well as one or more of the clients 1 through N (reference numerals 430 through 432) has deployed thereon a retail establishment feedback tool (respective reference numerals 441 through 443 and reference numerals 431 through 433) configured to enable distribution or sharing of real-time feedback received from one or more customers to all customers in the retail infrastructure 402. Further, as shown in FIG. 4, one or more users may interface with the retail establishment system 404 in order to provide feedback and/or request feedback. In an embodiment, the one or more users access the retail establishment system 404 via servers 440 through 442 located within the respective retail stores 1 through N. In an alternative embodiment, the users may access the retail establishment system 404 via individual clients 430 through 432 from external locations besides a retail store, such as, a kiosk, home or work, etc. To this extent, infrastructure 402 provides a secure environment. In particular, a user at a client 430 accesses the retail establishment feedback system 404 over a network via interfaces (e.g., Web browsers) loaded on the client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 446, or by an independent entity. Regardless, use of infrastructure 402 and the teachings described herein could be offered to the parties on a subscription or fee-basis. In either scenario, an administrator (reference numeral 434) could support and configure retail infrastructure 402.

The retail system 404 is shown to include a CPU (hereinafter "processing unit 406"), a memory 412, a bus 410, and input/output (I/O) interfaces 408. Further, the server 404 is shown in communication with external I/O devices/resources 424 and storage system 422. In general, processing unit 406 executes computer program code stored in memory 412, such as the retail establishment feedback tool 414. While executing the retail establishment feedback tool 414, the processing unit 406 can read and/or write data, to/from memory 412, storage system 422, and/or I/O interfaces 408 and can record or store feedback 426 collected in storage system 422 and can retrieve feedback 426 stored in storage system 422. Alternatively, the feedback 426 can be stored in a separate storage external to infrastructure 402. Further, although not shown, the feedback collected by a given store may be stored locally within a storage system in addition to being stored centrally within storage system 422. Further yet, the feedback provided by shoppers or customers can be stored in a distributed system, such that, if a customer at one store queries the contents stored in that store's system, that store's system could query multiple distributed sites for relevant feedback. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable server 404 to communicate with one or more other computing devices.

Computer infrastructure 402 is only illustrative of various types of computer infrastructures for implementing the invention. For example, in one embodiment, computer infrastructure 402 may comprise two or more server groups or clusters that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or storage system(s) 422 could be contained within computer system 400, not externally as shown.

Storage system 422 can be any type of system (e.g., a database) capable of providing storage for information under the present invention. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Further, in yet another embodiment, the invention provides a process for deploying computing infrastructure comprises integrating computer-readable code into a computing system, wherein the code in combination with the computing system is capable of performing a process of distributing customer feedback in a retail environment. The process comprises creating a tag corresponding to feedback to be inputted into a tool, the tag being configured to extrapolate on the feedback. In an embodiment, the tag comprises at least one of an image tag, an audio tag or a textual tag and the tag comprises at least one of a product-related tag or a location-related tag. Further, the process comprises collecting by the tool in real-time the feedback inputted by one or more customers using a plurality of devices that are configured to communicate with the tool, the feedback inputted pertaining to one or more aspects of a retail environment, identifying, using the tool, respective locations of the one or more customers and identifying one or more products in the retail environment, storing by the tool the feedback collected from the one or more customers and providing a user access to the feedback stored based on either an inquiry submitted to the tool by the user or based on a current location of the user identified by the tool. In an embodiment, the user comprises at least one of a customer of the one or more customers that has inputted feedback or a customer that has not inputted feedback. The process further comprises retrieving in real-time by the tool a subset of the feedback collected based on either the inquiry submitted to the tool by the user or based on a current location of the user identified by the tool. In an embodiment, the collecting step further comprises identifying whether the feedback inputted pertains to either a product or a location within the retail environment and adding, by the tool, one or more additional tags to the feedback collected based on the determining step in order to facilitate retrieval of the feedback collected. In an embodiment, the aspect of the retail establishment comprises at least one of product, service, store operation, recommendation, review, overall shopping experience or miscellaneous.

Accordingly, any of the components of the present invention as shown in FIG. 4 can be deployed, managed, serviced by a service provider 446 who offers to provide distribution or sharing of real-time feedback received from customers to all customers in a retail environment. Preferably, the invention provides a business method that performs the process steps of the invention on a subscription, advertising and/or fee basis. In particular, a service provider, such as a solution integrator could offer to enable distribution or sharing of real-time feedback received from customers of one store to customers of a related chain of stores or to other customers in an unrelated chain of stores in a retail environment. In this case, the service provider can, for instance, create, maintain, and support a computer infrastructure that performs the process steps of the invention for one or more stores or sellers. In return, the service provider can receive payment from the one or more stores/sellers under a subscription and/or fee agreement and/ or the service provider can receive payment from the sale or advertising of content to one or more third parties.

Furthermore, in yet another embodiment, the invention provides a method of selling products to customers in a selling environment, such as, a retail environment or a wholesale environment. The method comprises providing, on a subscription basis, a tool to be deployed on a system utilized by a subscribed seller among one or more subscribed sellers in a selling environment, the tool being configured to catalog a plurality of products sold by a respective subscribed seller according to a respective location within the respective subscribed seller and inputting feedback using tags created by one or more customers utilizing one or more electronic devices within the respective subscribed seller, wherein the one or more electronic devices communicate the feedback inputted to the tool deployed on the system utilized by the respective subscribed seller. Further, the method comprises identifying, using the tags created, respective locations of the one or more customers within the respective subscribed seller and allowing a user (either a customer that has inputted feedback or a customer that has not inputted feedback) access to the feedback collected based on either an inquiry submitted to the tool by the user or based on a current location of the user identified by the tool. Furthermore, the method comprises recommending to the user one or more products based on either the inquiry submitted by the user or based on proximate locations of the one or more products to the current location of the user identified by the tool, such that the one or more products recommended to the user promote sale of the one or more products. The method further comprises calculating a respective subscription fee for the tool provided to the respective subscribed seller among the one or more subscribed sellers based at least in part on usage history of the tool by the respective subscribed seller over a specified time duration. Alternatively, the method comprises calculating the subscription fee for the tool provided to the respective subscribed seller among the one or more subscribed sellers based at least in part on sale history of the one or more products recommended by the tool within the respective subscribed seller over a specified time duration.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing distribution of customer feedback in a retail environment, said method comprising the steps of:
   receiving, into a tool, feedback inputted by one or more customers using a plurality of portable devices that are configured to communicate with said tool, said feedback inputted pertaining to one or more aspects of a retail environment;
   identifying, using said plurality of portable devices that are configured to communicate with said tool, respective locations of said one or more customers by continuously tracking, in real-time, movement of said plurality of portable devices;
   collecting, using said tool, said feedback inputted by said one or more customers pertaining to said one or more aspects of said retail environment, wherein said feedback comprises a respective first tag for inputting a respective feedback into said tool, said respective first tag being configured to extrapolate on said respective feedback inputted, wherein said respective first tag comprises at least one of: an image tag, an audio tag and a textual tag, and wherein said respective first tag comprises at least one of: a product-related tag and a location-related tag;
   determining whether said feedback inputted pertains to either a product or a location within said retail environment;
   adding, by said tool, based on said determining in order to facilitate retrieval of said feedback collected, one or more additional tags to said feedback inputted by said one or more customers pertaining to said one or more aspects of said retail environment, wherein said one or more additional tags are extrapolated from said respective first tag in order to facilitate retrieval of said feedback inputted;
   providing a user access to said feedback collected, including said one or more additional tags extrapolated from said respective first tag based on either an inquiry submitted to said tool by said user or based on a current location of said user identified by said tool, wherein said user comprises at least one of: a customer of said one or more customers that has inputted said feedback and a customer, other than said one or more customers, that has not inputted said feedback, and wherein access by the user to said one or more additional tags extrapolated from said respective first tag is determined based on a preference of the user to specify an amount and degree to which the one or more additional extrapolated tags are retrieved and provided to the user; and
   presenting said user with additional information besides said feedback collected based on either said inquiry submitted to said tool by said user or based on said current location of said user identified by said tool.

2. The method according to claim 1, wherein said identifying step further comprises the step of:
   tracking, using said tool, a respective location of said user for identifying a respective location of said user.

3. The method according to claim 2, wherein said collecting step further comprises the step of:

recording said feedback inputted by said one or more customers pertaining to said one or more aspects of said retail environment in real-time.

4. The method according to claim 1, wherein said providing step further comprises the step of:
retrieving in real-time a subset of said feedback collected based on either said inquiry submitted to said tool by said user or based on said current location of said user identified by said tool.

5. The method according to claim 1, wherein said one or more aspects of said retail environment comprises at least one of: product, service, store operation, recommendation, review, overall shopping experience and miscellaneous.

6. A system for providing distribution of customer feedback in real-time, comprising:
a network communications channel;
one or more servers connected to said network communications channel and to a trans-retail establishment server connected to said network communications channel, each of said one or more servers corresponding to one or more retail establishments, each of said one or more servers having deployed thereon a tool for distributing feedback received in real-time from one or more customers of said one or more retail establishments, said tool comprising:
 a location tracking module configured to detect a location of a customer of said one or more customers providing feedback for an aspect of a retail establishment of said one or more retail establishments by continuously tracking, in real-time, movement of a portable device operated by said customer of said one or more customers within said retail establishment of said one or more retail establishments, said portable device configured to communicate with said tool;
 an item identifier module configured to identify one or more products in said one or more retail establishments;
 a collection module configured to:
  collect in real-time, utilizing said location tracking module and said item identifier module, said feedback received in real-time from said one or more customers for said aspect of said retail establishment of said one or more retail establishments, wherein said aspect of said retail establishment of said one or more retail establishments comprises at least one of: product, service, store operation, recommendation, review, overall shopping experience and miscellaneous, wherein said feedback is collected using at least one tag, said tag comprising at least one of: a text tag, an audio tag and a visual tag, and wherein said tag comprises at least one of: product-related data and location-related data;
  determine whether said feedback inputted pertains to either a product or a location within said retail environment;
  allow a user access to said feedback collected, and wherein said user comprises at least one of: a customer of said one or more customers that has inputted said feedback and a customer, other than said one or more customers, that has not inputted said feedback; and
 an update module configured to update said feedback collected and stored within said storage module by adding, based on said determining in order to facilitate retrieval of said feedback collected, one or more additional tags to said feedback inputted by said one or more customers pertaining to said one or more aspects of said retail environment, wherein said one or more additional tags are extrapolated from said at least one tag in order to facilitate retrieval of said feedback inputted,
wherein said collection module is further configured to allow a user access to said one or more additional tags, extrapolated from said at least one tag, and additional information, based on either an inquiry submitted to said tool by said user or based on a current location of said user identified by said tool, and wherein access by the user to said one or more additional tags extrapolated from said respective first tag is determined based on a preference of said user to specify an amount and degree to which the one or more additional extrapolated tags are retrieved and provided to the user.

7. The system according to claim 6, further comprising:
one or more clients connected to said network communications channel, said one or more clients being configured to allow input of said feedback for said aspect of said retail establishment of said one or more retail establishments, said one or more clients being configured to send inquiries from said user with respect to said one or more retail establishments; said one or more clients being configured to communicate to a server of said one or more servers a respective location of said user.

8. The system according to claim 7, wherein said trans-retail establishment server has deployed thereon said tool for enabling real-time distribution of said feedback collected to said user of said one or more retail establishments and to additional users of other retail establishments different than said one or more retail establishments, and wherein said additional users comprise at least one of: customers that have inputted said feedback and customers that have not inputted said feedback collected.

9. The system according to claim 8, wherein each of said one or more servers and said trans-retail establishment server further comprises:
an input module configured to receive input of said feedback into said tool;
a storage module configured to store said feedback collected; and
a retrieval module configured to access and retrieve said feedback collected and stored in said storage module.

10. A computer program product for distributing retail information in a retail environment, said computer program product comprising:
a non-transitory computer readable medium;
first program instructions to collect feedback pertaining to one or more aspects of a retail environment inputted by one or more customers using a plurality of portable devices, said first program instructions including instructions to determine whether said feedback inputted pertains to either a product or a location within said retail environment, and wherein said first program instructions further include instructions to receive a tag corresponding to said feedback inputted, said tag comprising at least one of: an image tag, an audio tag and a text tag, and wherein said first program instructions further include instructions to create, based on said determining in order to facilitate retrieval of said feedback collected, additional tags extrapolated from said tag corresponding to said feedback inputted in order to facilitate retrieval of said feedback collected;
second program instructions to identify respective locations of said one or more customers by continuously tracking, in real-time, movement of said plurality of portable devices, and to identify one or more products in said retail environment;

third program instructions to search said feedback collected based on either an inquiry submitted by said user or based on a current location of said user identified, wherein said user comprises at least one of: a customer of said one or more customers that has inputted said feedback and a customer other than said one or more customers that has not inputted said feedback, and wherein said first, second and third program instructions are recorded on said computer recordable medium;

fourth program instructions to retrieve a subset of said additional tags extrapolated from said tag corresponding to said feedback inputted corresponding to a subset of said feedback collected based on either said inquiry submitted by said user or based on said current location identified, wherein retrieval of said subset of said additional tags extrapolated from said tag corresponding to said feedback inputted corresponding to a subset of said feedback is determined based on a preference of said user to specify an amount and degree to which the one or more additional extrapolated tags are retrieved and provided to the user, and wherein said fourth program instructions are recorded on said computer recordable medium; and fifth program instructions to present said user with additional information besides said feedback collected based on either said inquiry submitted to said tool by said user or based on said current location of said user identified by said tool.

11. The computer program product according to claim 10, wherein said first program instructions include instructions to collect said feedback in real-time.

12. The computer program product according to claim 11, wherein said third program instructions include instructions to search additional retail information besides said feedback collected and to retrieve a subset of said additional retail information searched based on either said inquiry submitted by said user or based on a current location of said user identified.

13. The computer program product according to claim 12, wherein said fourth program instructions include instructions to retrieve said feedback in real-time, wherein said one or more aspects of said retail environment comprises at least one of: product, service, store operation, recommendation, review, overall shopping experience and miscellaneous, and wherein said tag comprises at least one of: product-related data and location-related data.

14. A process for deploying computing infrastructure comprising integrating computer-readable code into a computing system, wherein said code in combination with said computing system is capable of performing a process of distributing customer feedback in a retail environment, said process comprising:

creating a tag corresponding to feedback to be inputted into a tool, said tag being configured to extrapolate on said feedback, wherein said tag comprises at least one of: an image tag, an audio tag and a textual tag, and wherein said tag comprises at least one of: a product-related tag and a location-related tag;

collecting by said tool in real-time said feedback inputted by one or more customers using a plurality of portable devices that are configured to communicate with said tool, said feedback inputted pertaining to one or more aspects of a retail environment, wherein the collecting further comprises determining whether said feedback inputted pertains to either a product or a location within said retail environment, and wherein the collecting further comprises adding, by said tool, based on said determining in order to facilitate retrieval of said feedback collected, one or more additional tags to said feedback collected based on said tag corresponding to said feedback inputted in order to facilitate retrieval of said feedback collected, and wherein said aspect of said retail environment comprises at least one of: product, service, store operation, recommendation, review, overall shopping experience and miscellaneous;

identifying, using said plurality of portable devices that are configured to communicate with said tool, respective locations of said one or more customers by continuously tracking, in real-time, movement of said plurality of portable devices, and identifying one or more products in said retail environment;

storing by said tool said feedback collected from said one or more customers;

providing a user access to said feedback stored based on either an inquiry submitted to said tool by said user or based on a current location of said user identified by said tool;

retrieving in real-time by said tool a subset of said one or more additional tags corresponding to said feedback collected based on either said inquiry submitted to said tool by said user or based on a current location of said user identified by said tool, wherein said user comprises at least one of: a customer of said one or more customers that has inputted said feedback and a customer other than said one or more customers that has not inputted said feedback, and wherein retrieval of said subset of said one or more additional tags corresponding to said subset of said feedback is determined based on a preference of said user to specify an amount and degree to which the one or more additional tags are retrieved and provided to the user; and presenting said user with additional information besides said feedback collected based on either said inquiry submitted to said tool by said user or based on said current location of said user identified by said tool.

15. The process according to claim 14, wherein said collecting step further comprises the steps of:

identifying whether said feedback inputted pertains to either a product or a location within said retail environment.

* * * * *